(12) United States Patent
Nyholm et al.

(10) Patent No.: US 11,460,455 B2
(45) Date of Patent: Oct. 4, 2022

(54) METHOD AND SYSTEM FOR DETERMINING THE INFLUENCE OF EXPERIMENTAL PARAMETERS ON A LIQUID CHROMATOGRAPHY PROTOCOL

(71) Applicant: Cytiva Sweden AB, Uppsala (SE)

(72) Inventors: Lena Nyholm, Uppsala (SE); Johan Arthursson, Uppsala (SE); Eva Olsson, Uppsala (SE); Ulrika Ohman, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 538 days.

(21) Appl. No.: 15/525,613

(22) PCT Filed: Nov. 11, 2015

(86) PCT No.: PCT/EP2015/076357
§ 371 (c)(1),
(2) Date: May 10, 2017

(87) PCT Pub. No.: WO2016/075207
PCT Pub. Date: May 19, 2016

(65) Prior Publication Data
US 2017/0322190 A1 Nov. 9, 2017

(30) Foreign Application Priority Data
Nov. 12, 2014 (SE) .................... 1451351-9

(51) Int. Cl.
*G01N 30/86* (2006.01)
*G01N 30/26* (2006.01)
*G01N 30/50* (2006.01)

(52) U.S. Cl.
CPC ......... *G01N 30/8658* (2013.01); *G01N 30/26* (2013.01); *G01N 30/50* (2013.01); *G01N 30/86* (2013.01)

(58) Field of Classification Search
CPC .......................... G01N 30/8658; G01N 30/26
(Continued)

(56) References Cited

U.S. PATENT DOCUMENTS

| 6,252,292 B1 | 6/2001 | Brintzinger et al. |
| 6,987,183 B2 | 1/2006 | Heikkila et al. |

(Continued)

FOREIGN PATENT DOCUMENTS

| CN | 85101444 A | 1/1987 |
| CN | 101829438 A | 9/2010 |

(Continued)

OTHER PUBLICATIONS

PCT International Search Report and Written Opinion for PCT Application No. PCT/EP2015/076357 dated Feb. 16, 2016 (8 pages).
(Continued)

*Primary Examiner* — John Fitzgerald
*Assistant Examiner* — Rodney T Frank
(74) *Attorney, Agent, or Firm* — Eversheds Sutherland (US) LLP

(57) ABSTRACT

Method for determining the influence of least a first and a second experimental parameter on a liquid chromatography protocol for purifying one or more target molecules from a sample, comprising the steps: —performing chromatography purifications of the sample at a plurality of different experimental conditions where at least the first and the second experimental parameter each are varied over a predetermined range, each purification being registered as a chromatogram by monitoring an output parameter indicative of the purification result during the purification; and— displaying in a graphical user interface at least a subset of the registered chromatograms as chromatogram-miniatures in an evaluation diagram wherein the position of each displayed chromatogram-miniature is determined by the (Continued)

experimental parameters for the corresponding purification, thereby allowing a user to visually determine trends and the influence of the experimental parameters on the liquid chromatography protocol.

24 Claims, 14 Drawing Sheets

(58) Field of Classification Search
USPC .......................................................... 73/61.52
See application file for complete search history.

(56) References Cited

U.S. PATENT DOCUMENTS

| | | |
|---|---|---|
| 7,420,563 B2 | 9/2008 | Wakabayashi |
| 8,838,397 B1 | 9/2014 | Schibler et al. |
| 9,435,777 B2 | 9/2016 | Yamamoto |
| 2002/0010566 A1 | 1/2002 | Chester et al. |
| 2012/0089344 A1 | 4/2012 | Wright |
| 2012/0166098 A1 | 6/2012 | McCreary et al. |
| 2014/0040323 A1 | 2/2014 | Nakao et al. |
| 2014/0078182 A1 | 3/2014 | Utsunomiya |

FOREIGN PATENT DOCUMENTS

| | | |
|---|---|---|
| JP | S47-102946 | 9/1977 |
| JP | 2009-054318 A | 3/2009 |
| JP | 2009-150876 A | 7/2009 |
| WO | 00/45929 A1 | 8/2000 |
| WO | 2005/079263 A2 | 9/2005 |
| WO | 2014/068786 A1 | 5/2014 |
| WO | 2015/006686 A1 | 1/2015 |

OTHER PUBLICATIONS

PCT International-Type Search Report for SE Application No. 1451351-9 dated Jun. 1, 2015 (8 pages).

Spectroscopy Skin for SIMCA 13, Version 1, Published Oct. 27, 2014 (http://www.umetrics.com/products/spectroscopyskin).

Amigo et al., "ChroMATHography: Solving Chromatographic Issued with Mathematical Models and Intuitive Graphics," Americal Chemical Society, 2010, 110(8):4582-4605.

Wolcott et al., "Computer Simulation for the Convenient Optimization of Isocratic Reversed-Phase Liquid Chromatographic Separations by Varying Temperature and Mobile Phase Strength," Journal of Chromatography A 869, 2000, 3-25.

Chinese Office Action for CN Application No. 201580070385.9 dated Apr. 26, 2018 (18 pages with English translation).

Chen et al., "Genetic Algorithms for Optimization of Liquid Chromatography Separation Conditions," Chromatography, 2002, 20(2):97-101.

Dejun et al., "The selection and optimization of high-speed countercurrent Chromatography Experiment System," Analytical Instruments, 2001, No. 3, pp. 31-34.

Wei et al. , "Optimization of the operating conditions in preparative liquid Chromatograpy," Biotechnology Bulletin, 2001, No. 2, pp. 32-35.

Yuzhu et al., "Overlapping resolution and time maps for optimization of chromatographic selectivity," Chromatography, 1992, 10(5):254-257.

Japanese Office Action for JP Application No. 2017-525400 dated Jul. 23, 2019 (11 pages with English translation).

METHOD AND SYSTEM FOR DETERMINING THE INFLUENCE OF EXPERIMENTAL PARAMETERS ON A LIQUID CHROMATOGRAPHY PROTOCOL

CROSS REFERENCE TO RELATED APPLICATIONS

This application claims the priority benefit of PCT/EP2015/076357 filed on Nov. 11, 2015 which claims priority benefit of Swedish Application No. 1451351-9 filed Nov. 12, 2014. The entire contents of which are hereby incorporated by reference herein.

FIELD OF THE INVENTION

The present invention relates to a method and a system for determining the influence of experimental parameters on a liquid chromatography protocol for purifying one or more target molecules from a sample, and more particularly to a simplified method for evaluation of the influence of different experimental parameters allowing a user to more readily visually determine trends and the influence of the experimental parameters on the liquid chromatography protocol.

BACKGROUND OF THE INVENTION

Biotechnological methods are used to an increasing extent in the production of proteins, peptides, nucleic acids and other biological molecules and compounds, for research purposes as well as in order to prepare novel kinds of drugs. Due to its versatility and sensitivity to the compounds, liquid chromatography is often the preferred purification method in this context. The term liquid chromatography embraces a family of closely related separation methods, which are all based on the principle that two mutually immiscible phases are brought into contact. More specifically, the target compound is introduced into a mobile (liquid) phase, which is contacted with a stationary phase. The target compound will then undergo a series of interactions between the stationary and mobile phases as it is being carried through the system by the mobile phase. In brief, the concept of chromatography relates to the separation of target molecules from other molecules in a sample based on differences in their respective physical or chemical properties in relation to the mobile and the stationary phases. Examples of commonly used chromatography purification techniques includes, but is not limited to: affinity chromatography (AC), Immobilized metal ion affinity chromatography (IMAC), flow-through chromatography, ion exchange chromatography (IEX), size-exclusion chromatography, reversed-phase chromatography (RPC), simulated moving-bed chromatography, hydrophobic interaction chromatography (HIC), gel filtration (GF), chromato-focusing and the like. Sometimes a purification protocol includes two or more purification steps of the using the same or different purification techniques.

The performance of a chromatography purification protocol is usually registered as a "chromatogram" by monitoring one or more output parameters during the purification. The output parameter may be any parameter that can be registered and which is representative of the performance of the purification. Examples of output parameters include, but are not limited to: UV absorbance at one or more wavelengths, conductivity, light scattering detection, fluorescence emission, mass-spectroscopy. A schematic example of a chromatogram 10 is shown in FIG. 1 wherein the solid line 20 represents the registered output parameter, e.g. UV absorbance of the eluted sample flow. The dashed line 30 represents a linear gradient of an eluent parameter e.g. pH, and interval A represents the fraction of the elution flow that contains the purified target substance as indicated by a peak in the registered output parameter value.

One challenge when designing a new a liquid chromatography protocol for purifying one or more target molecules from a sample is to determine the influence of different experimental parameters in order to find the best possible chromatography protocol settings. One common goal is to find a chromatography protocol which provides the target molecule of sufficient purity and yield to a low cost and as fast as possible. In this process, time is a crucial factor in order to speed up e.g. the over-all drug development processes. Automation of purifications using automated liquid chromatography systems like ÄKTA™ avant and ÄKTA™ pure from GE Healthcare makes it possible to quickly try out different experimental conditions but generates lots of data that needs to be evaluated to decide how to proceed to achieve the goal.

SUMMARY OF THE INVENTION

The object of the invention is to provide a new method and a liquid chromatography system for determining the influence of at least a first and a second experimental parameter on a liquid chromatography protocol. which method and biosensor system overcomes one or more drawbacks of the prior art. This is achieved by the method and system as defined in the independent claims.

The current invention supports the user's decision making and thus speeds up the time from experiment to concluding results. The invention utilises information from the experimental setup and links it to the results so that data can be automatically organized to visualize the impact of different experimental conditions. In this way trends can be easily revealed. The user can more quickly come to a decision what purification protocol to use to fulfil the needs.

A more complete understanding of the present invention, as well as further features and advantages thereof, will be obtained by reference to the following detailed description and drawings.

DETAILED DESCRIPTION OF THE INVENTION

Figure 1:
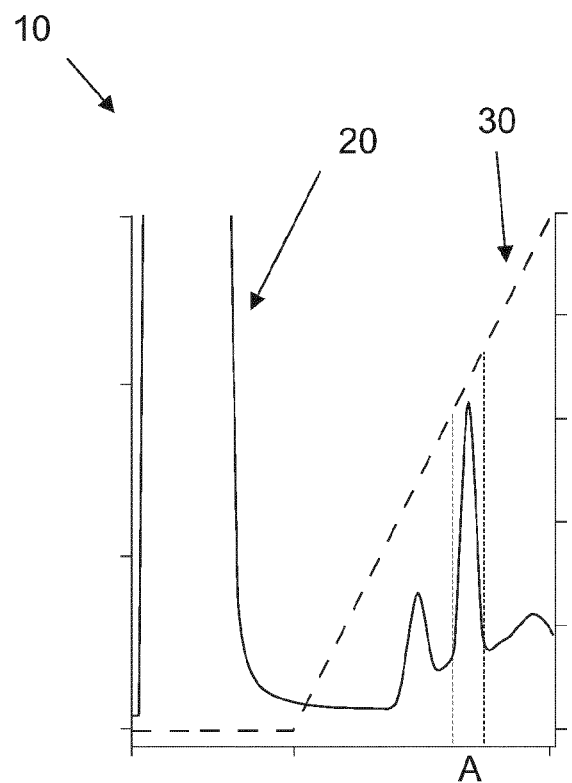
FIG. 1 is a schematic example of a chromatogram.

As mentioned above, the present invention relates to a method and a liquid chromatography system for determining the influence of least a first and a second experimental parameter on a liquid chromatography protocol for purifying one or more target molecules from a sample.

Definitions

Throughout this specification and the claims the following terms are used in accordance with the following non-limiting definitions:

Liquid chromatography purification/Purification: As mentioned above, the term liquid chromatography purification refers to any current or future chromatography-based act or process of purifying one or more target molecules from a sample, e.g. by the removal of impurities and/or other non-target molecules. Examples of liquid chromatography purification include, but are not limited to: affinity chromatography, immobilized metal ion affinity chromatography flow-through chromatography, ion exchange chromatography, size-exclusion chromatography, reversed-phase chromatography, simulated moving-bed chromatography, hydrophobic interaction chromatography, gel filtration, chromatofocusing. Further, throughout the specification and claims the term "purification" is used as a short form for "liquid chromatography purification" and is intended to have the same meaning. However, the scope of related terms like purifying, purifies, purified, pure, etc. are in no way limited in scope by this definition.

Experimental parameter: The term "experimental parameter" refers to any parameter that can be modified and which may have an influence on the performance of a liquid chromatography protocol. An experimental parameter may be a variable parameter that can be varied over a continuous range, like pH, ionic strength or flow rate of an eluent etc., but also the rate of change of a gradient or the like. Further an experimental parameter may be of discrete type where the parameter can only be set to different discrete states, like chromatography media type, type of salt in eluent etc, but also the presence of a specific additive or not—i.e. an on-off parameter. Further, as is evident to one skilled in the art, some experimental parameters may be of discrete type in one phase of the evaluation but variable in another, e.g. evaluation of type of salt in eluent in a first phase and evaluation of salt concentration and or gradient characteristics in a second phase. Examples of experimental parameters include, but are not limited to: eluent ionic strength, eluent pH, eluent flow rate, eluent type, column characteristics, chromatography media characteristics, load pH, load conductivity, load concentration, load mass, load HCP, load additive, wash volume, wash pH, wash conductivity, wash additive, step elution level, Step elution volume, gradient target level, gradient volume, cut OD, buffer system, media type, bed height, flow velocity, residence time, type of salt, solvent, buffer additive.

Liquid chromatography protocol: The term "liquid chromatography protocol" refers to a protocol defining the settings of experimental parameters for a chromatography purification process. A liquid chromatography protocol may comprise one or more chromatography purification steps, and may further be combined with other steps, like filtration and the like.

Target molecule: The term "target molecule" refers to the molecule to be separated and thus purified from one or more other molecules in a sample based on differences in their respective physical or chemical properties in relation to the mobile and the stationary phases. The target molecule may be a biomolecule, such as a protein, antibody, polypeptide, polynucleotide, DNA or the like Sample: The term "sample" refers to the initial liquid sample at least comprising the target molecule to be separated and thus purified. The sample may be any liquid comprising the target molecule, such as a biologically derived sample liquid, e.g. originating from a cell culture, a living organism, a body liquid or the like.

Chromatogram: The term "chromatogram" refers to a graphical representation of one or more output parameters as registered during at least a part of the chromatography purification. The chromatogram may present the output parameter as a function of time, accumulated volume or any other parameter relevant for the chromatography purification.

Output parameter: The term "output parameter" refers to a registerable parameter that is indicative of the result of a chromatography purification. The output parameter may e.g. be a measurement of one or more properties in the output flow from a chromatography purification and the output parameter(s) may be selected from, but are not limited to: UV absorbance at one or more wavelengths, conductivity, light scattering detection, fluorescence emission, mass-spectroscopy, registered flow, registered pH, registered pressure.

Quality metric: The term "quality metric" refers to any metric representative of the quality of the chromatography purification. A quality metric may be a metric determined from one or more chromatograms registered during the chromatography purification, it may be a metric derived from a purification result parameter such as purity, purification time etc., or it may be a complex metric calculated from a combination of several parameters.

Development of Chromatography Purification Protocols:

As mentioned, the need to obtain a target molecule with sufficient purity and quantity in an efficient and economical way applies essentially to any chromatography purification protocol, from preparation of an enriched protein extract for biochemical characterization to large-scale production of a therapeutic recombinant protein or the like.

As mentioned, a chromatography purification protocol may comprise one or more purification steps, and in one example a protocol comprises three purification steps commonly referred to as capture, intermediate purification, and polishing. Table 1 illustrates relative characteristics for a selection of different chromatography purification techniques and relative use in the different purification steps of a three step protocol. When designing a chromatography purification protocol there are four important performance parameters to consider when planning each purification step: resolution, capacity, speed, and recovery. Optimization of any one of these four parameters can be achieved only at the expense of the others, and each purification step will be a compromise. The importance of each parameter will vary depending on the purpose of each purification step, e.g. whether a purification step is used for capture, intermediate purification, or polishing or the like. Purification methods should be selected and optimized to meet the objectives for each purification step. Even though recovery may not be the key parameter to be optimized, it will nonetheless be of concern in any preparative situation, especially for production of a high-value product, and it is then important to assay for recovery during optimization of the capture step.

TABLE 1

| Method | Typical characteristics | | Purification phase | | |
| --- | --- | --- | --- | --- | --- |
| | Resolution | Capacity | Capture | Intermediate | Polishing |
| AC | +++ | +++ or ++ | +++ | ++ | + |
| IMAC | +++ | ++ | +++ | ++ | + |
| GF | ++ | + | + | | +++ |
| IEX | +++ | +++ | +++ | +++ | +++ |
| HIC | +++ | ++ | ++ | +++ | +++ |
| Chromato-focusing | +++ | + | | | ++ |
| RPC | +++ | ++ | | + | ++ |

The optimal balance between capacity and resolution must be defined for each case. As in a capture stage, selectivity will be important, not only to achieve high binding capacity for the target molecule. However, in contrast to most capture steps, selectivity during elution is important and is usually achieved by applying a continuous gradient or a multi-step elution procedure.

In addition to the different selectivities available through the various purification methods, the purification efficiency depends strongly on the selection of different chromatography media available for each method. The efficiency, flow resistance, selectivity, and capacity differ between media. The particle size of the medium strongly affects efficiency and flow resistance.

A medium with large beads give columns with low efficiency (the peaks are broad) and low backpressure, whereas small beads give high efficiency and high backpressure. Early in the purification process (e.g., the capture stage) high speed is often required because the sample volume is large and the sample quickly needs to be stabilized. There is less focus on the resolution. Chromatography media with large particles should be selected that give low backpressure at high flow rates. In the polishing stage focus is put on high purity, which can be obtained with chromatography media with high efficiency, that is, small beads. These media give higher backpressure that may require lower flow rates and columns that resist high pressure. These limitations are acceptable because the sample volume and amounts in this stage are smaller.

Protocol Development

Development of a chromatography purification protocol, e.g. for a biopharmaceutical drug, requires laboratory-scale purification to obtain material for research and throughout the discovery and development phases. When the first purification protocol is being developed, future process development needs to be considered by avoiding the use of methods that cannot be efficiently scaled up. Regulatory requirements also change when moving from a purification process for the explorative discovery environment to a purification process for the highly regulated production environment.

Process development involves choosing and optimizing chromatography methods and noting how they are optimized with respect not only to basic performance but also to robustness, simplicity, costs, capacity, and so on. Similarly, the choice of proper chromatography media should be made in terms of chemical and physical stability, functionality, reproducibility, and so on. A thorough knowledge of the purification parameter space is needed to ensure a robust process. It is therefore necessary to explore a wide range of chromatography conditions early, to increase process understanding and increase the likelihood of developing a robust purification process.

In column chromatography purification, the target molecule may be separated from contaminants by binding to the stationary phase (the chromatography medium), followed by selective elution or, alternatively, by binding impurities, allowing the target protein to pass through the column without being retained. Alternatively, purifications may be performed under conditions that delay sample components (without binding), thereby giving different elution positions. GF is one example of this latter method.

Binding of target molecules allows fractionation during the elution step. Elution is achieved by changing the conditions in the eluent, for example, by increasing salt concentration, changing pH, or adding substances that compete with the target protein for the ligands on the chromatography medium.

There are three possible elution methods:

Gradient elution: The eluent composition is changed continuously toward conditions favoring dissociation of target molecules from the chromatography medium. Elution position will differ between substances e.g. depending on their affinity.

Stepwise elution: The eluent composition is changed stepwise, at one or several occasions. Several substances may be eluted in each step.

Isocratic elution: The composition of the eluent is selected to give weak or no interactions between sample components and chromatography medium, and the conditions are kept unchanged during the entire purification (binding and elution). The target protein passes through the column slower or faster than impurities.

Gradient elution allows separation of components with a wider range of properties compared with isocratic elution, and peak tailing is reduced. The steeper the gradient, the closer the target molecules will be eluted. Gradients are in most cases linear, but can in some cases be convex, concave, or with a custom-programmed shape in order to optimize the resolution within certain parts of the gradient. Stepwise elution is a faster alternative to gradient elution; it uses discrete steps instead of a continuous gradient. The buffer consumption is lower, and simpler equipment, for example, manual formats, can be used. Therefore, stepwise elution is often preferred for routine and large-scale purifications. Optimization may be required to achieve satisfactory results. Often optimization of elution conditions is performed by gradient elution, and suitable conditions are selected and then used for step elution.

Figure 2:
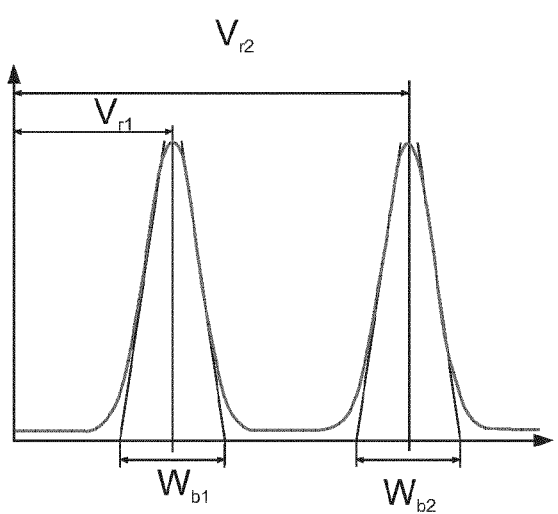
FIG. 2 is an illustration of how to determine resolution of a chromatogram.

The resolution of a chromatographic purification is a combination of the distance between the peaks eluted from the column (selectivity) and the ability of the column to produce narrow, symmetrical peaks (efficiency). These factors are influenced by practical factors such as matrix properties, binding and elution conditions, column packing, flow rates, and system peak broadening. Resolution ($R_s$) is defined as the distance between peak maxima compared with the average base width (Wb) of the two peaks. $R_s$ can be determined from a chromatogram, as shown in FIG. 2.

$$R_S = \frac{V_{R2} - V_{R1}}{\frac{W_{b1} + W_{b2}}{2}} \qquad \text{Eq. 1}$$

Figure 3A:
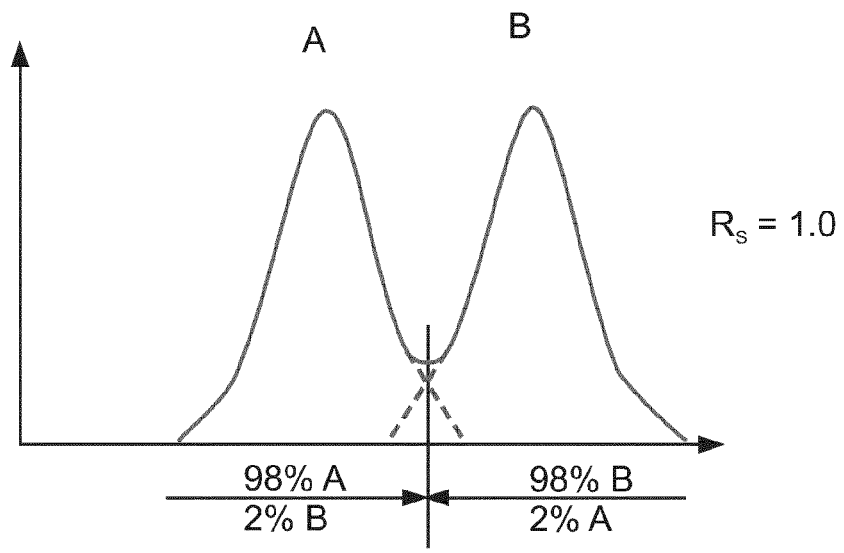
FIGS. 3a and 3b show two examples of chromatogram with different resolution.
Figure 3B:
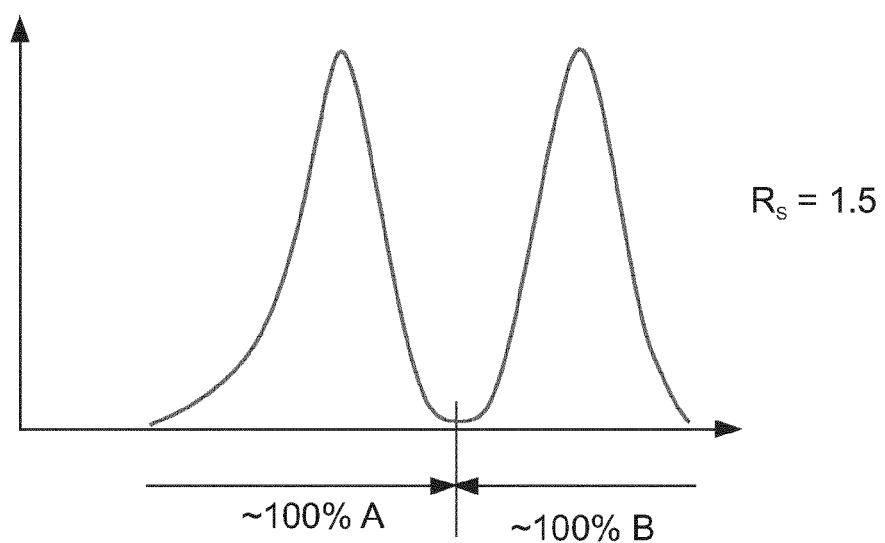

Elution volumes and peak widths are measured with the same units to give a dimensionless resolution value. $R_s$ gives a measure of the relative separation between two peaks and can be used to determine if further optimization of the chromatography procedure is necessary. If Rs=1.0, then 98% purity has been achieved at 98% of peak recovery, provided the peaks are symmetrical and approximately equal in size. Baseline resolution requires that Rs>1.5. At this value, the peak purity is nearly 100% as is illustrated in FIGS. 3a and 3b.

A single, well-resolved peak is not necessarily a pure substance, but may represent several components that could not be separated under the chosen elution conditions. Further purification may be required using an alternative chromatography method.

Column efficiency is characterized as the ability to elute narrow, symmetrical peaks from a packed bed, and relates to the peak broadening that occurs on the column and is frequently stated in terms of the number of theoretical plates. The key factors for efficiency are bead size, column dimensions, packing of the column, and flow rate. High efficiency also requires small peak broadening, in the column and in the chromatography system; see the section on peak broadening below. Good column packing gives high efficiency. This is especially true for GF columns. Uneven packing, a too tightly or too loosely packed bed, or a bed containing air bubbles will lead to uneven passage of sample (and buffer) through the column, peak broadening, and hence loss of resolution.

The particle size is a significant factor for efficiency. The smallest particles will give the most efficient mass transfer, which results in the narrowest peaks under suitable elution conditions and with a well-packed column. Although efficiency can be improved by decreasing the particle size of the matrix, using smaller particles creates an increase in backpressure so that flow rates need to be decreased, thus lengthening the run time. Hence it is preferable to match the chromatography medium with the requirements for the purification (speed, resolution, purity, etc.).

Figure 4A:
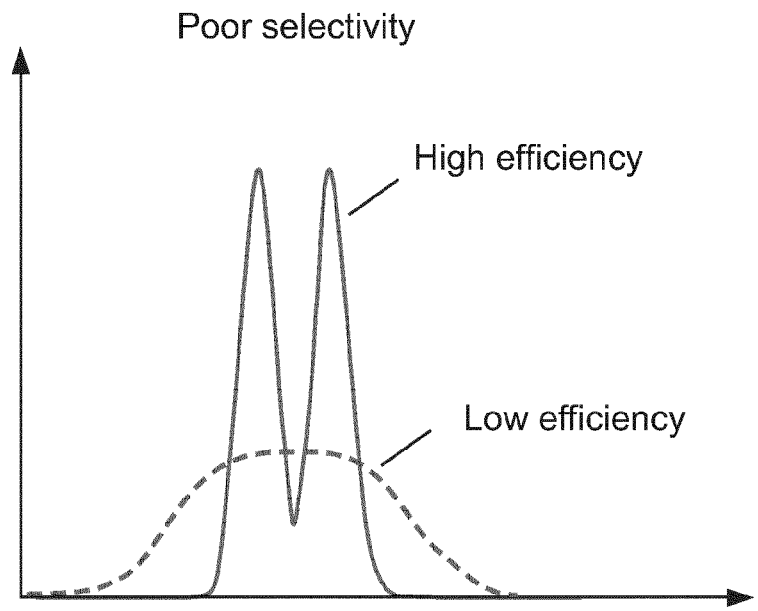
FIGS. 4a and 4b show two examples of chromatogram with different selectivity.
Figure 4B:
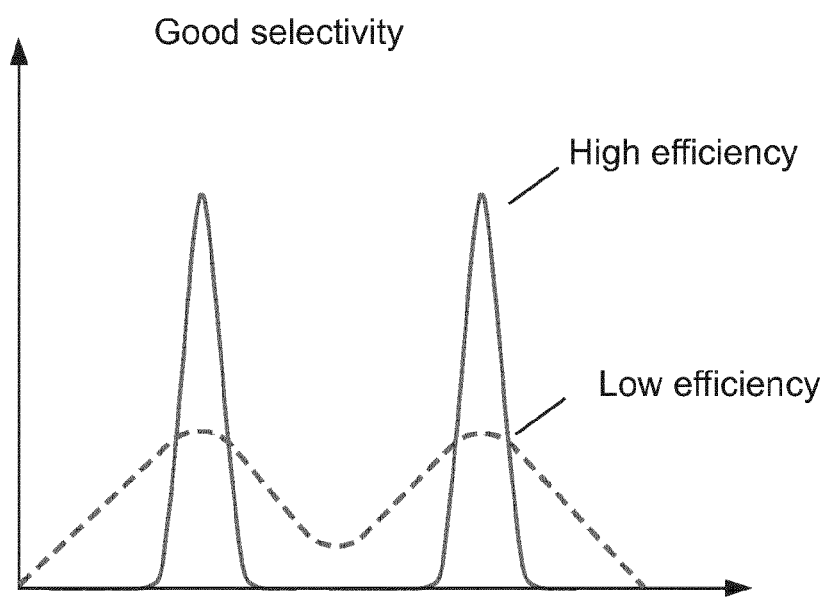

Selectivity is characterized as the degree of separation between peaks, and it has a great impact on resolution and is a more important factor than high efficiency in determining resolution as illustrated in FIGS. 4a and 4b.

Selectivity depends on several factors: the nature of the ligand (for AC, IEX, HIC, etc.) and its degree of substitution and distribution on the matrix (IEX and HIC); and the characteristics of the matrix, especially the pore structure (GF). The selectivity obviously also depends on the target molecule, the impurities, and conditions used for purification, including mode of elution. Establishing a balance between these properties leads to a well-resolved, highly selective separation.

Resolution greatly depends on the selectivity and efficiency of the chromatography medium. In addition to this, the column hardware and the chromatography system give a broadening of the peaks that are eluted. One of the main causes of peak broadening is longitudinal diffusion (diffusion in the column direction) of the sample. Peak broadening can be minimized if the distances available for longitudinal diffusion are minimized, for example, by keeping columns as short as possible while still obtaining enough selectivity. The combination of chromatography medium and column hardware should be carefully selected.

The design of the chromatography system and the suitable combination of column and system is important to avoid extensive peak broadening. All components in the flow path of the chromatography system will contribute to peak broadening to a different degree, for example, tubing/capillaries, cells for in-line detection, valves, and so on. The length of the tubing should be as short as possible. The tubing diameter will also greatly affect peak broadening. Chromatography systems for high-resolution chromatography should thus have short and narrow tubing. To obtain the best resolution, it may be necessary to optimize the flow path and only connect the necessary components, for example, column valves, and in-line cells for pH or conductivity measurements.

Hence it can be concluded that there are a wealth of experimental parameters that need to be established in order to provide an optimized liquid chromatography protocol. And there is a need for facilitating the process of determining the influence of experimental parameters on a liquid chromatography protocol for purifying one or more target molecules from a sample. The present invention relates to a visualization tool that assists the user of the tool in the decision process to achieve an improved or even optimized chromatography protocol.

Figure 5:
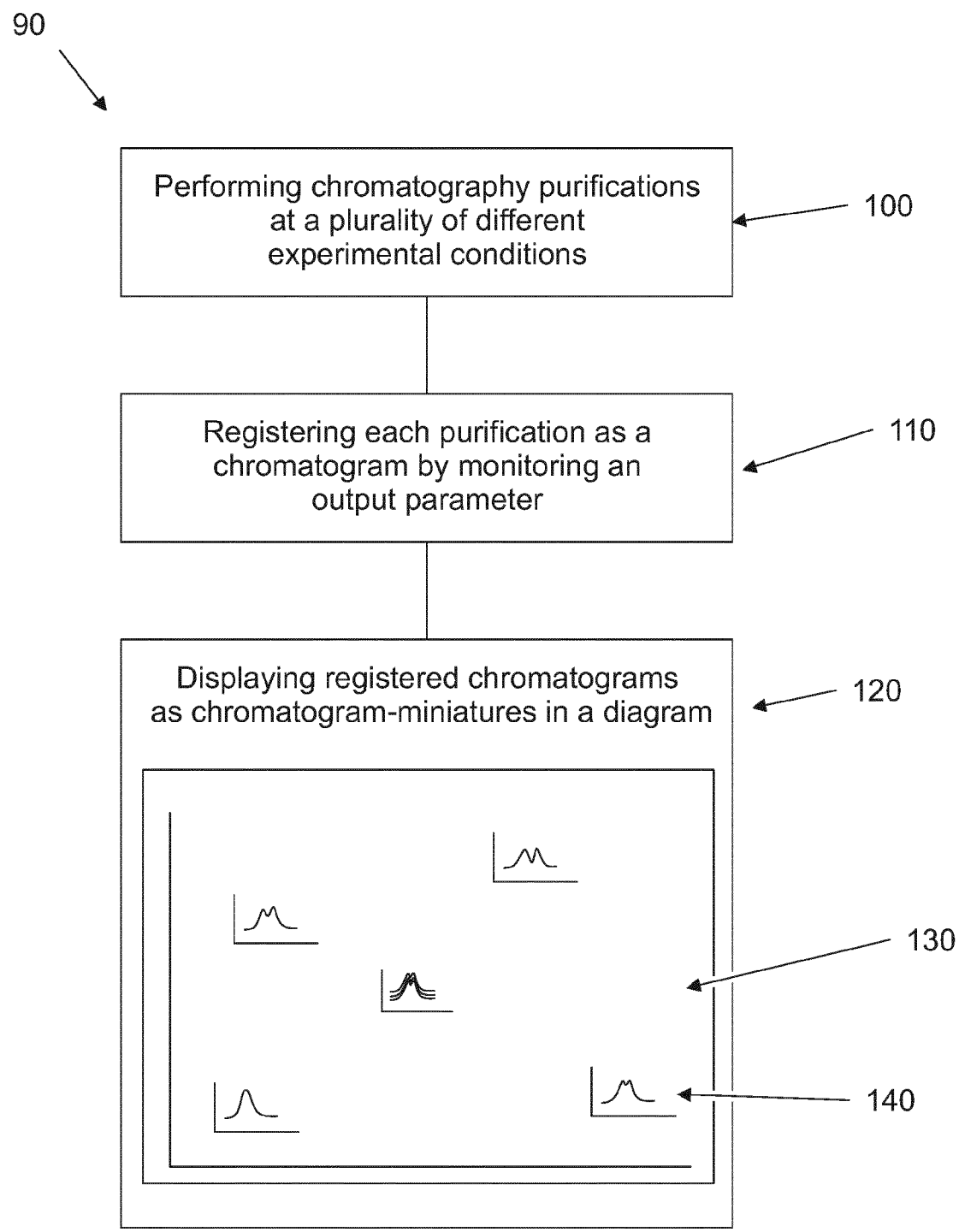
FIG. 5 shows a schematic block diagram of one embodiment of a method according to the present invention.

According to one embodiment schematically disclosed in FIG. 5 there is provided a method 90 for determining the influence of least a first and a second experimental parameter on a liquid chromatography protocol for purifying one or more target molecules from a sample, comprising the steps:

performing chromatography purifications 110 of the sample at a plurality of different experimental conditions where at least the first and the second experimental parameter each are varied over a predetermined range, each purification being registered as a chromatogram 110 by monitoring an output parameter indicative of the purification result during the purification; and displaying 120 at least a subset of the registered chromatograms as chromatogram-miniatures 140 in a diagram 130 wherein the position of each displayed chromatogram-miniature 140 is determined by the experimental parameters for the corresponding purification, thereby allowing a user to visually determine trends and the influence of the experimental parameters on the liquid chromatography protocol.

As mentioned above, the least a first and a second experimental parameters refers to any parameter that can be modified and which may have an influence on the performance of a liquid chromatography protocol. As different experimental parameters may influence the same or similar properties in the chromatography purification result, the method comprises the step of:

performing chromatography purifications of the sample at a plurality of different experimental conditions where at least the first and the second experimental parameter each are varied over a predetermined range, By providing a plurality of purifications at different experimental conditions where two different experimental parameters each are varied it is thus possible to investigate the influence and interaction between said experimental parameters on the registered properties. The number of chromatography purifications that are performed at different experimental conditions should be selected to provide an "interaction plane" for the pair of experimental parameters. In one example there are four different experimental conditions wherein the first and the second experimental parameters are each varied between a first and a second state such that the conditions are:

TABLE 2

|   | Par. 1 | Par 2 |
|---|--------|-------|
| 1 | Low    | Low   |
| 2 | High   | Low   |
| 3 | Low    | High  |
| 4 | High   | High  |

In other examples, one or more of the experimental parameters may be set to one or more intermediate states, thus providing additional experimental conditions. Further, as some experimental parameters may be difficult to control, the same state (e.g. High) may not necessarily mean the same parameter value but rather a relative setting. In one example comprising intermediate parameter states the following conditions are explored:

TABLE 3

|   | Par. 1 | Par 2 |
|---|--------|-------|
| 1 | Low    | Low   |
| 2 | Mid    | Mid   |
| 3 | High   | Low   |
| 4 | Mid    | Mid   |
| 5 | Low    | High  |
| 6 | Mid    | Mid   |
| 7 | High   | High  |

In this example, purifications are performed at 5 different experimental conditions, but the mid-mid condition is repeated in between the other conditions in order to provide a reliability measure by comparing the results from the mid-mid purifications. In other examples, purifications may be performed at 6 or more different experimental conditions depending on the nature of the experimental parameters, e.g. 7, 8, 9, 10, 15, 20, 25 or more including any intermediate number. According to one embodiment, the plurality of different experimental conditions are determined using a statistical design of experiments (DoE) module.

In the present method, each purification is registered as a chromatogram by monitoring an output parameter during the purification. The term "output parameter" refers to a registerable parameter that is indicative of the result of a chromatography purification. Examples of output parameters include but are not limited to: UV absorbance at one or more wavelengths, conductivity, light scattering detection, fluorescence emission, mass-spectroscopy, registered flow, registered pH, registered pressure. The output parameter is suitably measured in line in the flow path downstream of the chromatography purification.

According to one embodiment, each chromatography purification may involve one or more of: affinity chromatography, immobilized metal ion affinity chromatography flow-through chromatography, ion exchange chromatography, size-exclusion chromatography, reversed-phase chromatography, simulated moving-bed chromatography, hydrophobic interaction chromatography, gel filtration, chromatofocusing, as disclosed more in detail above. Depending on the type of chromatography purification involved, as well as the desired result of the investigation, the experimental parameters that are varied may be selected from a wide range of parameters including but not limited to:

Eluent parameters like: eluent ionic strength, eluent pH, eluent flow rate, eluent type, step elution level, Step elution volume, gradient target level, gradient volume or the like Hardware and media parameters like: column characteristics, chromatography media characteristics, media type, bed height or the like Sample load parameters like: load pH, load conductivity, load concentration, load mass, load HCP, load additive or the like Wash step parameters like: wash volume, wash pH, wash conductivity, wash additive or the like Buffer parameters like: cut OD, buffer system, type of salt, solvent, buffer additive or the like.

Process settings like: flow velocity, residence time or the like.

Figure 6A:
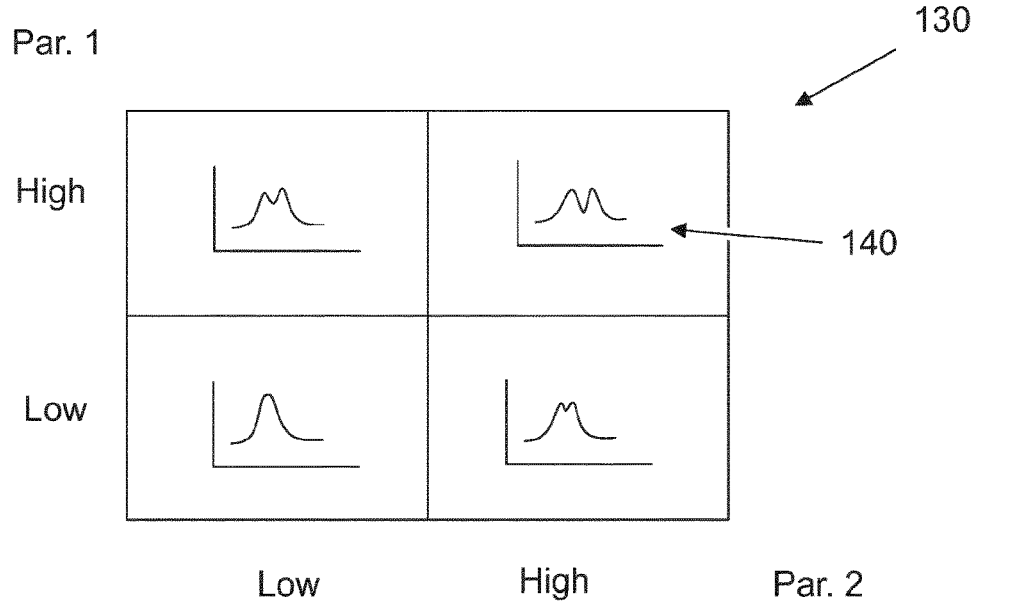
FIGS. 6 to 14 illustrate different embodiments of the present invention.
Figure 6B:
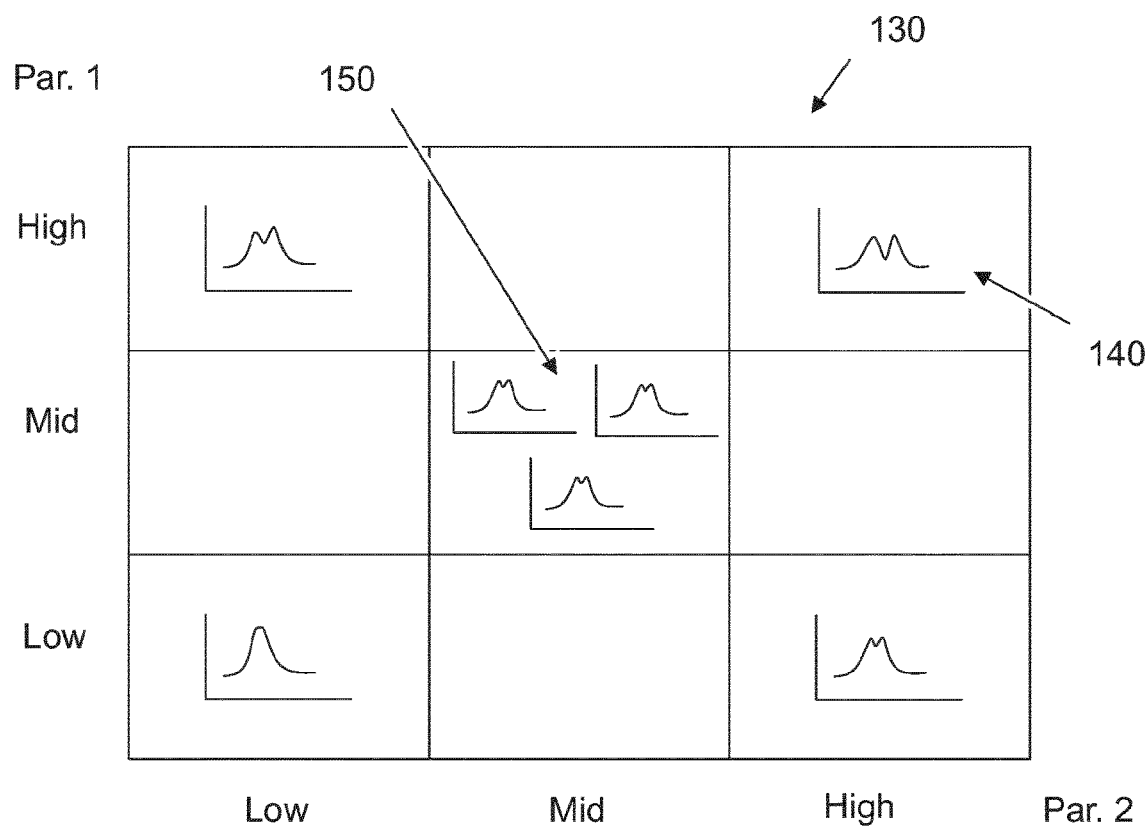

In accordance with one embodiment, the step of displaying 120 at least a subset of the registered chromatograms as chromatogram-miniatures 140 in a diagram 130 involves displaying the chromatogram-miniatures at respective positions based on the relative order of the experimental parameters for the corresponding experiment. FIGS. 6a and 6b show schematic diagrams 130 for two examples wherein the experimental parameters are varied in accordance with table 2 and 3 respectively, and wherein each chromatogram-miniature 140 is arranged at the corresponding relative position in the diagram 130. In FIGS. 6a and 6b the diagram 130 provides a "matrix representation" of the plurality of different experimental conditions, which may be used both with discrete as well as continuous type experimental parameters. In one embodiment where at least one of the experimental parameters is a continuous parameter, the value of the parameter may not be identical for the same relative position although the corresponding chromatogram-miniature 140 is shown in the matrix position corresponding to the relative position, e.g. high, medium or low respectively.

By providing a visual representation in a diagram 130 of the resulting chromatograms as chromatogram-miniatures 140 at the relative positions corresponding to the plurality of different experimental conditions users are allowed to visually determine trends and the influence of the experimental parameters on the liquid chromatography protocol, based directly on their interpretation of the resulting appearance of the respective chromatogram-miniatures 140. Compared to conventional methods of evaluating the influence of the experimental parameters wherein each chromatogram is viewed independently or in overlay mode, or wherein result parameter values are extracted from the chromatograms and presented as data vales in a diagram, the present method provides a wealth of additional information intuitively accessible to the user.

In FIGS. 6a and 6b the chromatogram-miniatures 140 are shown as schematic chromatograms, but it should be understood that the chromatogram-miniatures 140 should represent the monitored output parameter chromatogram. In some cases the series of chromatography purifications includes two or more purifications performed at the same experimental conditions, e.g. as is shown above in table 3, and the corresponding chromatogram-miniatures 140 may then be displayed as a multi chromatogram-miniature 150 at the same relative position in the diagram, e.g. as shown in FIG. 6b wherein the chromatogram-miniatures are shown side by side at the mid-mid position or alternatively grouped around the experimental parameter position. Such a multi chromatogram-miniature 150 may further be displayed as an overlay chromatogram-miniature wherein the different chromatograms may be shown in different colors, line type or the like, as a 3D representation or the like. Still alternatively, chromatograms registered at the same experimental conditions may be displayed using a difference plot technique adapted to indicate the variation between the different chromatograms.

According to one embodiment, the chromatogram miniatures are displayed using a normalized scale whereby a user readily can determine differences in yield and the like.

In one embodiment, each purification is registered as two or more chromatograms by monitoring two or more output parameters during the purification. The two or more registered chromatograms may be displayed similarly to multi chromatogram-miniatures according to above or as separate diagrams that may be selected by the user in the graphical user interface. In one embodiment two or more output parameter curves may be displayed in the same chromatogram-miniature whereby it is possible to see the correlation between the two or more output parameters. Still further, the chromatogram-miniatures may comprise a curve representing an experimental parameter, such as eluent gradient or the like.

Figure 7:
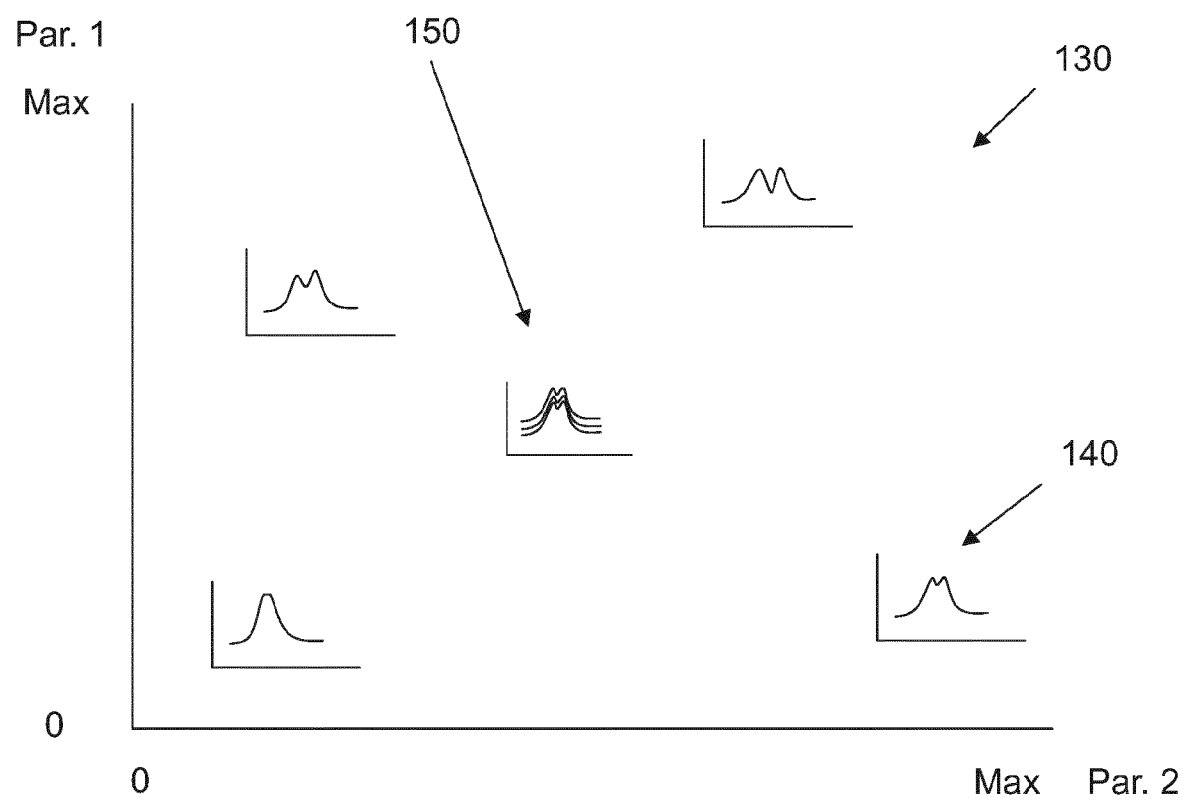

According to one embodiment, schematically disclosed in FIG. 7, the diagram 130 comprises coordinate system having a first dimension representing the value of the first experimental parameter and having a second dimension representing the value of the second experimental parameter and wherein the chromatogram-miniatures 140 are positioned at the coordinates defined by the experimental parameters for the corresponding experiment. In FIG. 7, the chromatograms registered for the mid-mid position is schematically disclosed as a 3D multi chromatogram-miniature 150. By displaying the chromatogram-miniatures 140 in a coordinate system as illustrated in FIG. 7 variations in the experimental parameters for the different purifications are directly displayed in an intuitive way. Moreover, additional purifications at freely selectable experimental conditions may be displayed.

Figure 8:
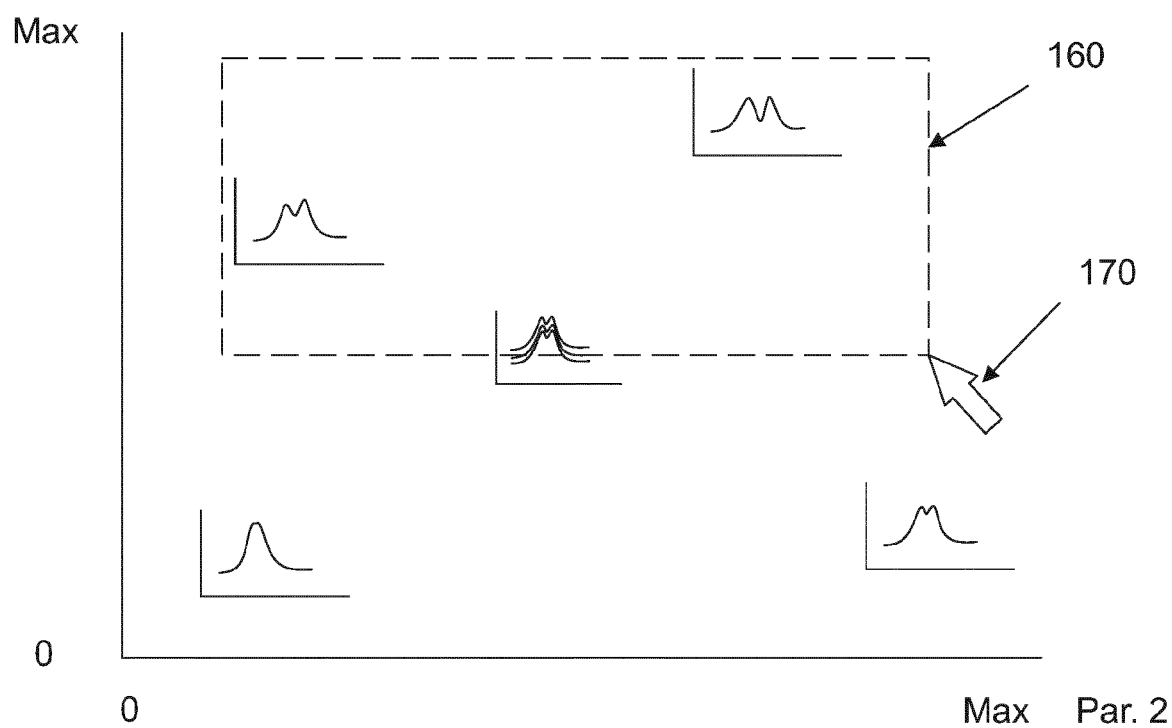
Figure 9:
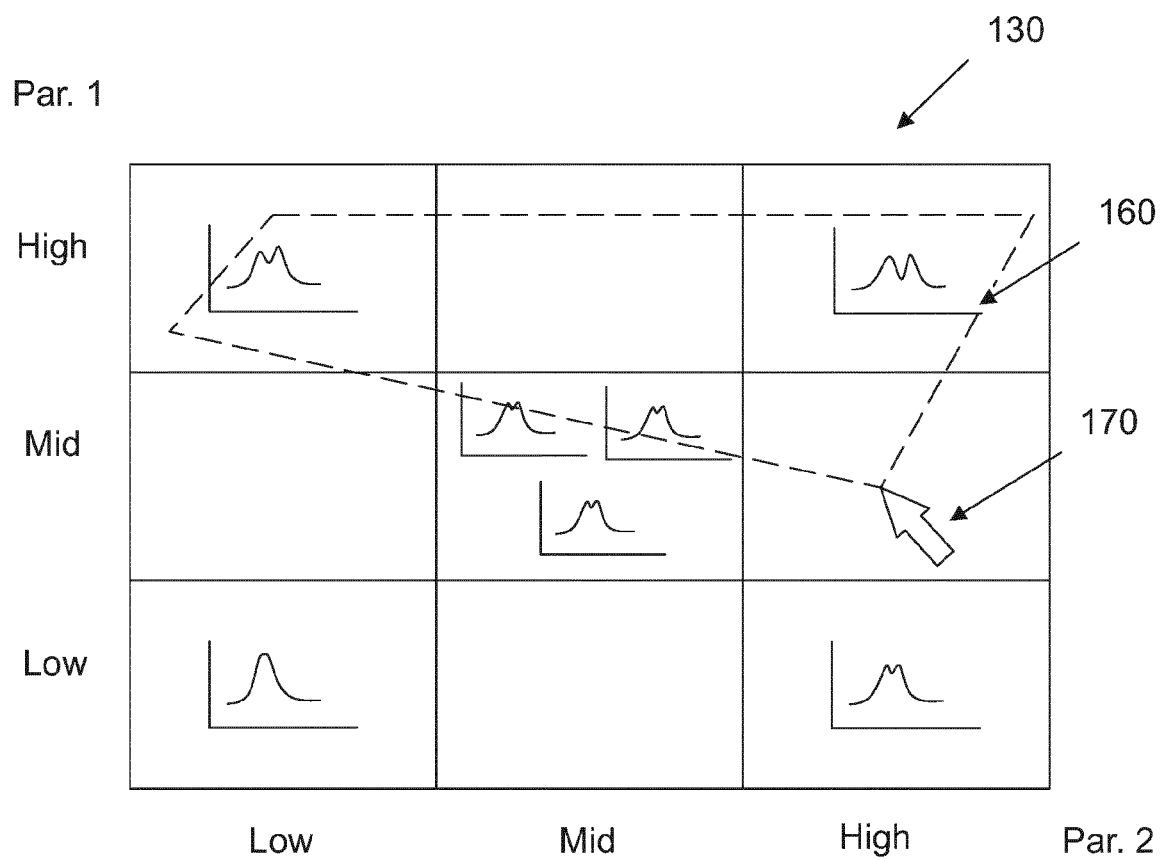

Many times, the method of determining the influence of least a first and a second experimental parameter involves repeating the steps of performing chromatography purification and displaying registered chromatograms, wherein at least one of the first and the second experimental parameter is varied over a narrower range, as determined from the step of displaying registered chromatograms. The selection of the narrower range for the experimental parameters is made by the user based on the results presented in the diagram. According to one embodiment, schematically disclosed in FIGS. 8 and 9, the step of defining chromatography protocol parameters for a subsequent chromatography purification experiment is performed by selecting one or more experimental parameter coordinates in the diagram. This selection may e.g be performed by marking a desired parameter region 160 in the diagram 130 using a pointer 170 or the like in the graphical user interface. In FIG. 8 the selected parameter region 160 is shown as a rectangle selection, but in alternative embodiments the selection may be of any shape. In FIG. 9 the diagram 130 is a matrix type diagram where chromatogram-miniatures are positioned based on the relative order of the experimental parameters for the corresponding experiment rather than the experimental parameter coordinates, but in order to enable intuitive selection of a narrower range for the experimental parameters, the selection is performed in an overlay coordinate system whereby the selection is transformed into real parameter ranges for subsequent experiments.

Figure 10:
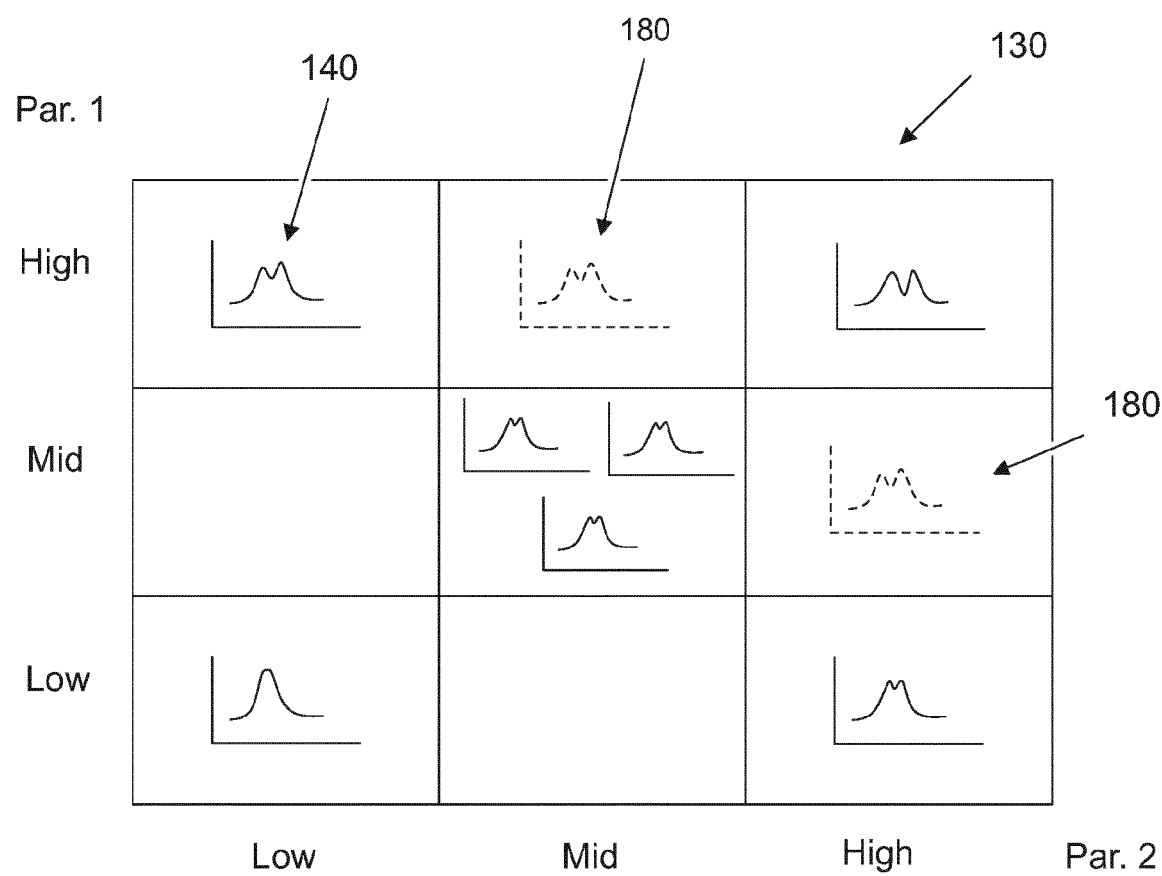
Figure 11:
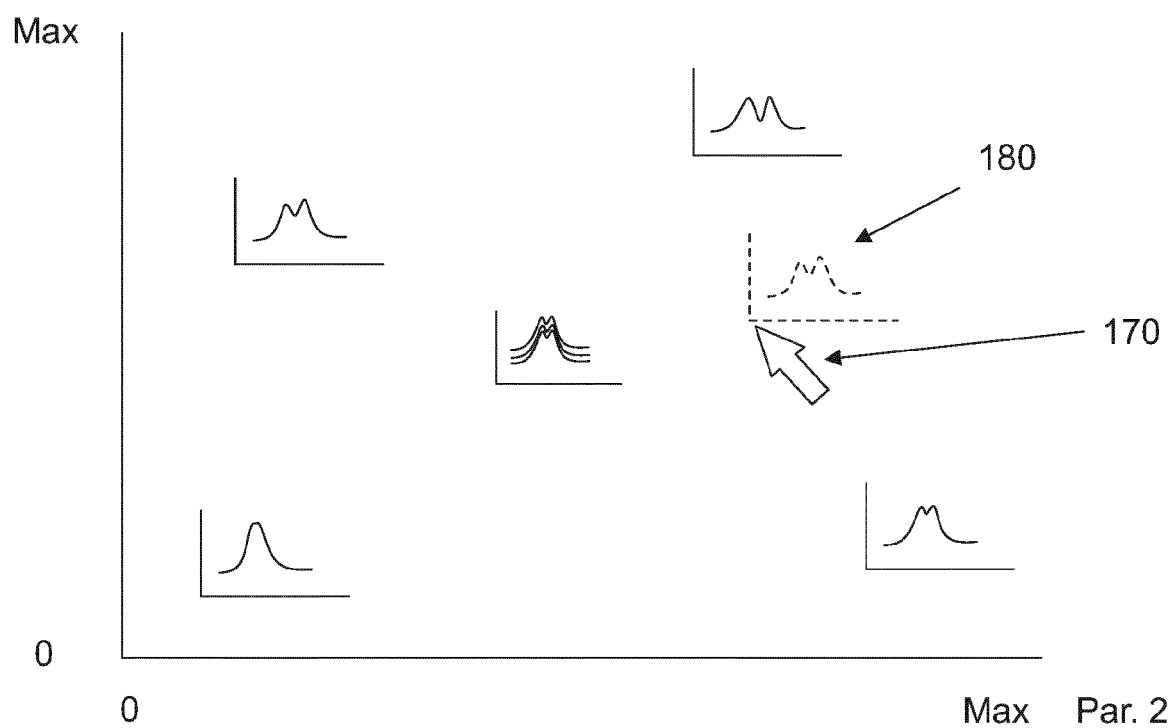

According to one embodiment, as schematically disclosed in FIGS. 10 and 11, the present method comprises the step of predicting the chromatogram for experimental parameters in the diagram for which no experimental chromatogram has been registered and displaying a predicted chromatogram-miniature 180 at the corresponding position in the diagram 130. The prediction of the chromatogram miniature may be based on interpolation algorithms using the chromatograms registered for the experimental parameters, or the like. FIG. 10 shows a diagram 130 of relative matrix type where experimental chromatogram miniatures are not available for certain parameter combinations, e.g. high-mid and mid-high, and wherein predicted chromatogram-miniatures 180 are displayed in said positions. As is indicated in FIG. 10, the predicted chromatogram-miniatures 180 are preferably graphically distinguishable from experimental chromatogram-miniatures 140, e.g. by color, line type or the like. According to one embodiment, schematically disclosed in FIG. 11, the step of predicting the chromatogram is performed in response to a user selection in the diagram whereby a chromatogram is predicted for the selected experimental parameter coordinates in the diagram and a predicted chromatogram-miniature 180 is displayed at the corresponding position. The selection of experimental parameters may e.g. be performed using a pointer device in the diagram coordinate system. In one embodiment, the predicted chromatogram-miniature 180 is updated in case the pointer is moved with respect to the experimental parameter coordinates. The parameter selections of predicted chromatogram-miniatures 180 may further be used as input parameters for performing additional purification experiments. In such cases, subsequent experimental purification chromatograms may be analyzed and used to update the chromatogram prediction algorithm, e.g. by machine learning.

According to one embodiment, the different experimental conditions involve varying one or more additional experimental parameter in order to determine the influence of a third or more experimental parameters. Such at least one of the additional experimental parameters may be displayed as an overlay diagram wherein the parameter value e.g. can be scrolled by means of a pointer device or the like. In one embodiment, the entire diagram 130 including all chromatogram miniatures 140 may be scrolled simultaneously, but alternatively each chromatogram miniature 140 may be scrolled individually in order to focus on the effect of said at least one of the additional experimental parameter at a particular experimental condition in the diagram. Further, one of said at least one additional experimental parameters may be displayed in a third dimension for each chromatogram-miniature 130 (not displayed).

Figure 12:
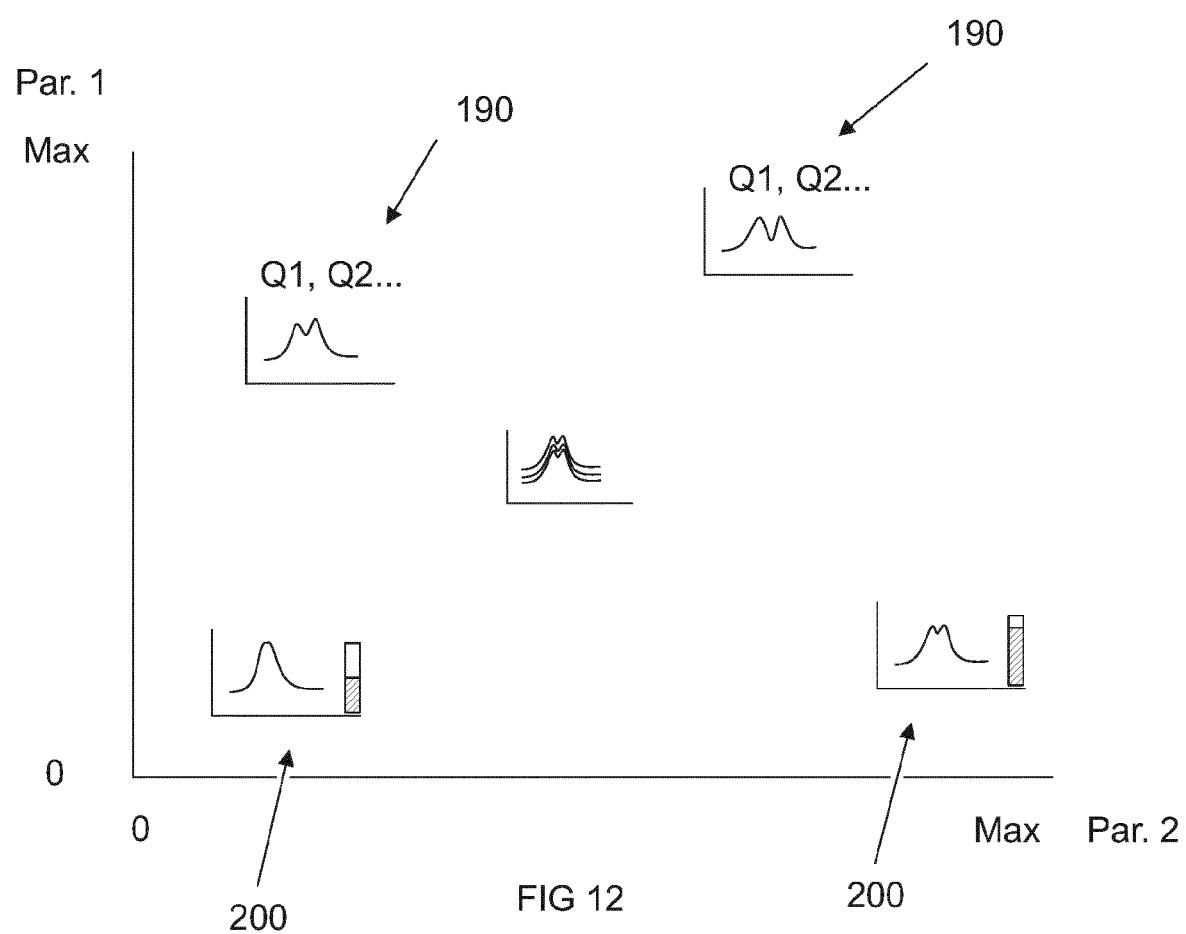
Figure 13:
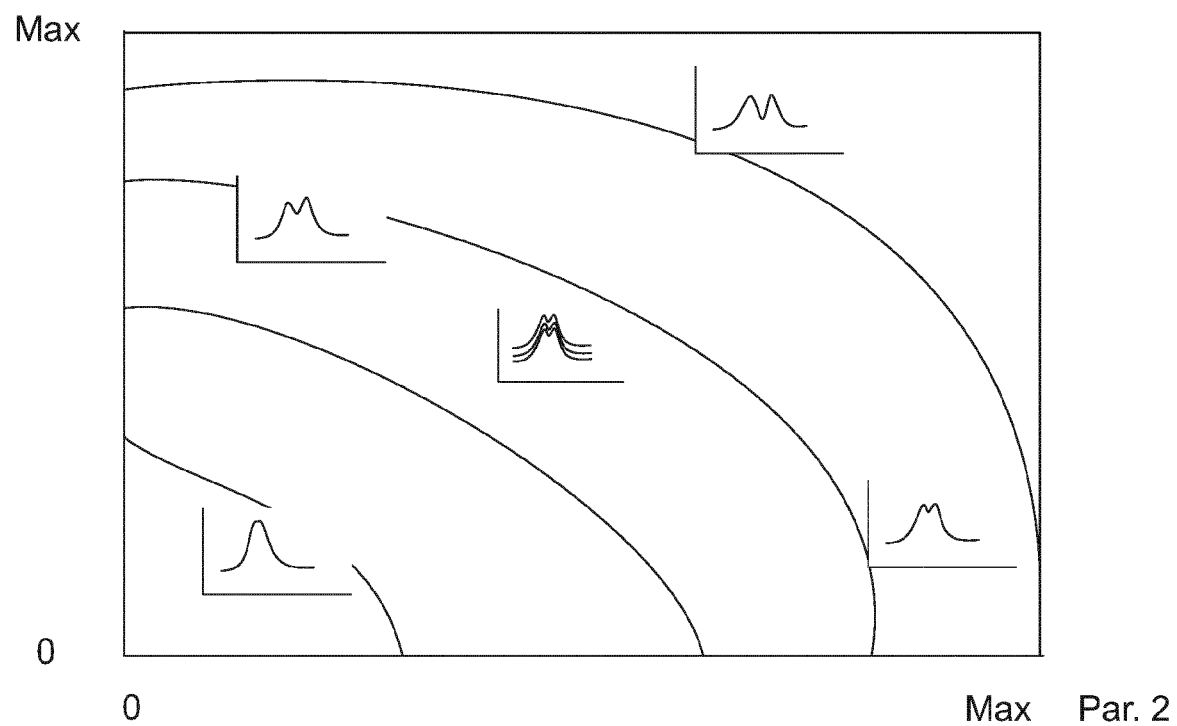

According to one embodiment, the present method comprises the step of determining one or more quality metrics associated with the chromatograms, and wherein the quality metric(s) is displayed in the diagram in combination with the chromatogram miniatures. According to one embodiment, at least one quality metric is derived from one or more of the output parameters and is selected from the group of: resolution, efficiency, selectivity, peak area, asymmetry and peak-broadening of the registered chromatogram. According to one embodiment, at least one quality metric is derived from a purification result parameter selected from the group of: purity, purification time, yield, results from external analysis of the purified sample, an output parameter different than the displayed parameter and purification cost. FIG. 12 shows some schematic examples of how said quality metric(s) may displayed in the diagram in combination with the chromatogram miniatures. In the top two chromatogram miniatures 190, the quality metrics are provided as parameter values Q1, Q2 . . . in association with the respective chromatogram miniatures 190, whereas in the bottom two chromatogram miniatures 200, a quality metric is provided as a bar graph indicating the value of the quality parameter. In FIG. 13, a quality metric is schematically provided as a "heat map" in the diagram thus indicating the influence of the experimental parameters on said quality metric over the whole span of the experimental parameters.

Figure 14:
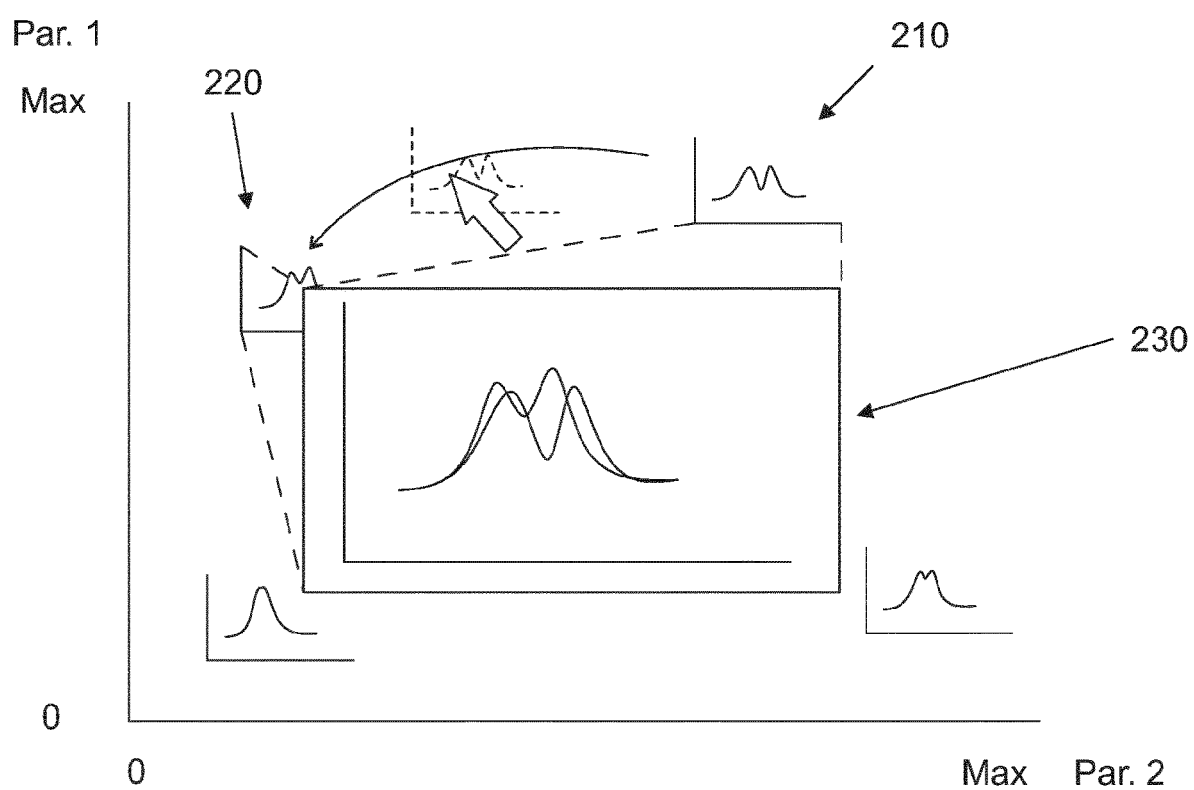
Figure 15:
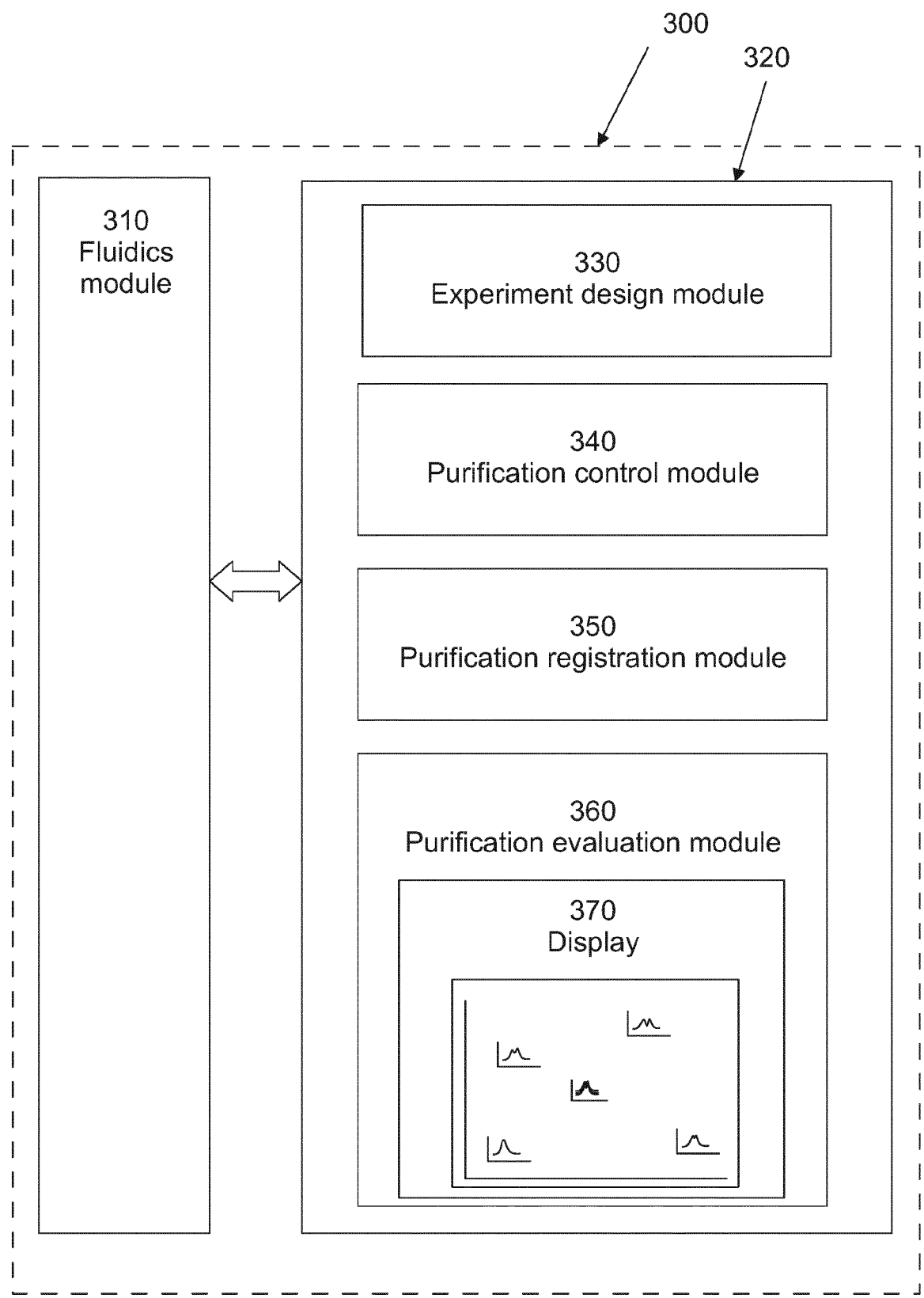
FIG. 15 shows a schematic block diagram of a liquid chromatography system according to one embodiment of the present invention.

The present method further comprises various ways of comparing chromatograms with each other to facilitate the determination of influence of the experimental parameters. FIG. 14 shows one schematic example wherein two chromatograms are presented in an overlay plot following a drag and drop operation on the chromatogram-miniatures performed by a user. According to this feature, a user may drag one of the chromatogram-miniatures 210 and drop it onto another chromatogram-miniature 220 using a pointer device or the like, and the graphical user interface is arranged to display an enlarged overlay plot 230 in response to the drop operation. The graphical user interface implementing the method of the present invention may comprise a range of similar ways of interacting with the chromatogram-miniatures in order to facilitate evaluation process.

According to one embodiment, there is provided a liquid chromatography system 300 arranged to perform the method steps as laid forward above. Such a liquid chromatography 300 system may comprise:

an automated fluidics module 310 for performing fluidics operations in association with liquid chromatography purifications.

an experiment design module 330 configured to allow a user to define an experimental sequence of liquid chromatography purification protocols for determining the influence of at least a first and a second experimental parameter on a liquid chromatography protocol for purifying one or more target molecules from a sample, the experimental sequence comprising a plurality of different experimental conditions where at least a first and a second experimental parameter each are varied over a predetermined range;

an purification control module 340 for controlling the operation of the chromatography system in accordance with the experimental sequence, and purification registration module 350 for registering the result of each purification as a chromatogram by monitoring an output parameter during the purification, an purification evaluation module 360 arranged to present on a display 370 at least a subset of the registered chromatograms as chromatogram-miniatures in a diagram wherein the position of each displayed chromatogram-miniature is determined by the experimental parameters for the corresponding purification, thereby allowing a user to visually determine trends and the influence of the experimental parameters on the liquid chromatography protocol.

Still further there is provided a computer program arranged to perform the method according to the above method steps when executed on a computer comprising processor and a display unit.

The invention claimed is:

1. Method for determining the influence of least a first and a second experimental parameter on a liquid chromatography protocol for purifying one or more target molecules from a sample, comprising the steps:

performing chromatography purifications of the sample at a plurality of different experimental conditions by varying at least the first and the second experimental parameter over a predetermined range, each purification being registered as a chromatogram by monitoring an output parameter indicative of the purification result during the purification;

displaying in a graphical user interface at least a subset of the registered chromatograms as chromatogram representations in an evaluation diagram defining at least two parameter axes, wherein the position of each displayed chromatogram representation along each parameter axis of the at least two parameter axes in the evaluation diagram is determined by the experimental parameters for the corresponding purification, thereby allowing a user to visually determine trends and the influence of the experimental parameters on the liquid chromatography protocol based on the positions of the displayed chromatogram representations along the at least two parameter axes in the evaluation diagram;

repeating the steps of performing chromatography purification and displaying registered chromatograms, wherein at least one of the first and the second experimental parameter is varied over a narrower range based on the positions of the displayed chromatogram representations along the at least two parameter axes;

determining, based on the narrower range of the least one of the first and the second experimental parameter in the evaluation diagram, the liquid chromatography protocol for purifying the one or more target molecules; and purifying the one or more target molecules by performing the liquid chromatography protocol.

2. Method according to claim 1 wherein each chromatography purification involves one or more of: affinity chromatography, flow-through chromatography, ion exchange chromatography, size-exclusion chromatography, reversed-phase chromatography, simulated moving-bed chromatography, hydrophobic interaction chromatography, chromatofocusing.

3. Method according to claim 1 wherein the experimental parameters are selected from: eluent ionic strength, eluent pH, eluent flow rate, eluent type, column characteristics, chromatography media characteristics, load pH, load conductivity, load concentration, load mass, load HCP, load additive, wash volume, wash pH, wash conductivity, wash additive, step elution level, Step elution volume, gradient target level, gradient volume, cut OD, buffer system, media type, bed height, flow velocity, residence time, type of salt, solvent, buffer additive.

4. Method according to claim 1 wherein each purification being registered as two or more chromatograms by monitoring two or more output parameters during the purification.

5. Method according to claim 4 wherein the output parameter(s) is selected from the group of: UV absorbance at one or more wavelengths, conductivity, light scattering detection, fluorescence emission, mass-spectroscopy, registered flow, registered pH, registered pressure.

6. Method according to claim 1 wherein the diagram comprises a matrix representation where chromatogram representations are positioned based on the relative order of the experimental parameters for the corresponding experiment.

7. Method according to claim 6 comprising the step of predicting the chromatogram for experimental parameters in the diagram and displaying predicted chromatogram representations in matrix positions where experimental chromatogram representations are not available.

8. Method according to claim 7 wherein predicted chromatogram representations are graphically distinguishable from experimental chromatogram representations.

9. Method according to claim 1 wherein the diagram comprises a coordinate system having a first dimension representing the value of the first experimental parameter and having a second dimension representing the value of the second experimental parameter and wherein the chromatogram representations are positioned at the coordinates defined by the experimental parameters for the corresponding experiment.

10. Method according to claim 9 comprising the step of defining chromatography protocol parameters for a subsequent chromatography purification experiment by selecting one or more experimental parameter coordinates in the diagram.

11. Method according to claim 9 comprising the step of, in response to a user selection in the diagram, predicting the chromatogram for experimental parameter coordinates in the diagram and displaying a predicted chromatogram representation.

12. Method according to claim 1 wherein the different experimental conditions involve varying one or more additional experimental parameter.

13. Method according to claim 12 wherein at least one of the additional experimental parameters is displayed as an overlay diagram wherein the parameter value can be scrolled.

14. Method according to claim 12 wherein one of the additional experimental parameters is displayed in the chromatogram representation as third dimension.

15. Method according to claim 1 wherein the plurality of different experimental conditions are determined using a statistical design of experiments (DoE) module.

16. Method according to claim 1 wherein two or more chromatograms are registered for the same experimental parameters, and wherein the two or more chromatograms are displayed in the same chromatogram representation or as individual chromatogram representations grouped around the experimental parameter position.

17. Method according to claim 1 wherein all chromatogram representations are displayed using a normalized scale.

18. Method according to claim 1 further comprising the step of evaluating one or more chromatogram to determine one or more quality metrics associated with the chromatogram, and wherein the quality metric(s) is displayed in the diagram in combination with the chromatogram representations.

19. Method according to claim 17 wherein one quality metric is derived from one or more of the output parameters and is selected from the group of: resolution, efficiency, selectivity, peak area, asymmetry, and peak-broadening of the chromatogram.

20. Method according to claim 17 wherein one quality metric is derived from a purification result parameter selected from the group of: purity, purification time, yield, biological activity, results from external analysis of the purified sample, an output parameter different than the displayed parameter and purification cost.

21. Method according to claim 1 wherein two or more chromatograms are presented in an overlay plots following a drag and drop operation on the chromatogram representations performed by a user.

22. Liquid chromatography system arranged to perform the method according to claim 1.

23. Liquid chromatography system according to claim 22 comprising:
   an experiment design module configured to allow a user to define an experimental sequence of liquid chromatography purification protocols for determining the influence of at least a first and a second experimental parameter on a liquid chromatography protocol for purifying one or more target molecules from a sample, the experimental sequence comprising a plurality of different experimental conditions where at least a first and a second experimental parameter each are varied over a predetermined range;
   a purification control module for controlling the operation of the chromatography system in accordance with the experimental sequence;
   a purification registration module for registering the result of each purification as a chromatogram by monitoring an output parameter during the purification;
   and a purification evaluation module arranged to present on a display at least a subset of the registered chromatograms as chromatogram representations in a diagram wherein the position of each displayed chromatogram representation is determined by the experimental parameters for the corresponding purification, thereby allowing a user to visually determine trends and the influence of the experimental parameters on the liquid chromatography protocol.

24. Computer program arranged to perform the method of claim 1 when executed on a computer comprising processor and a display unit.

* * * * *